July 5, 1955  H. J. PEOPLES  2,712,280
CULTIVATOR SHOVEL AND SHOVEL-SUPPORTING SHANK CONSTRUCTION
Filed Nov. 10, 1954
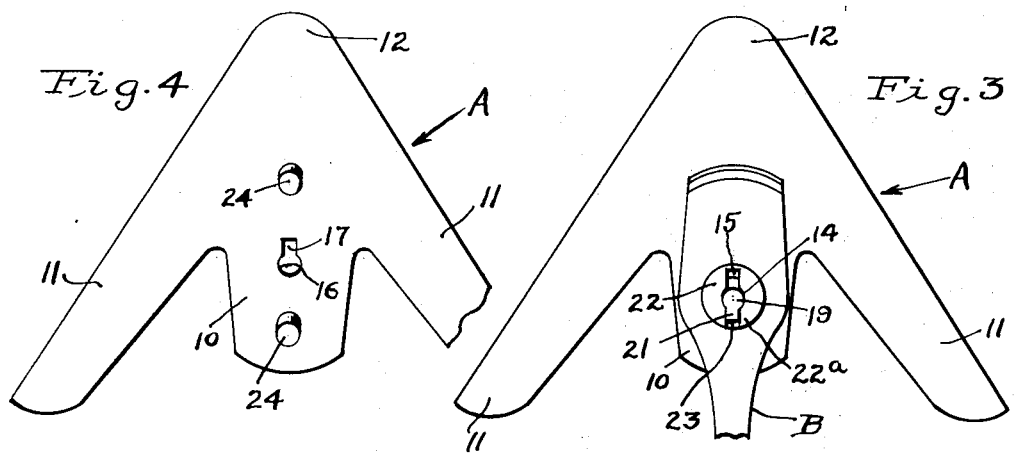
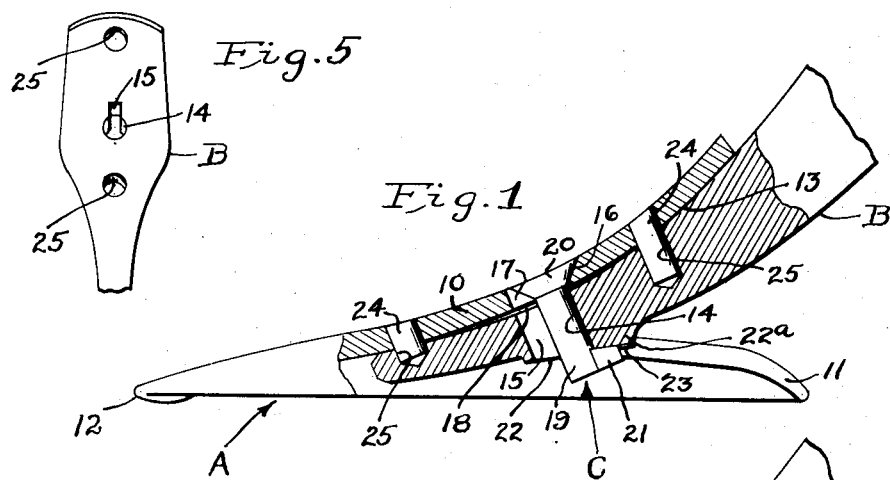
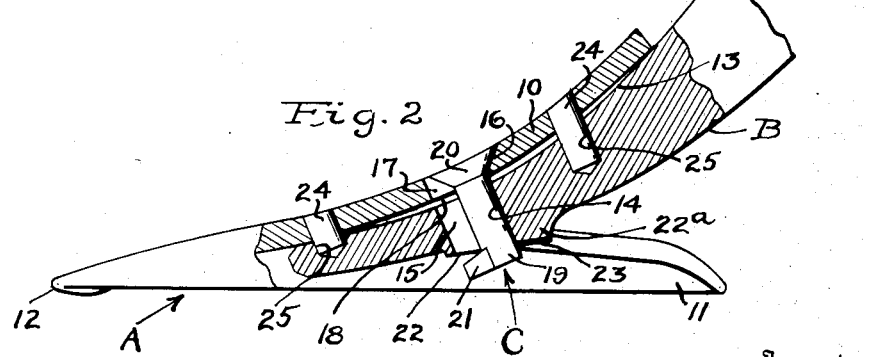
Inventor
Harold J. Peoples
By Caswell + Lagaard

United States Patent Office 2,712,280
Patented July 5, 1955

2,712,280

CULTIVATOR SHOVEL AND SHOVEL-SUPPORTING SHANK CONSTRUCTION

Harold J. Peoples, Fertile Township, Walsh County, N. Dak.

Application November 10, 1954, Serial No. 468,016

3 Claims. (Cl. 97—198)

My invention relates to improvements in cultivators and particularly to a cultivator shovel and shovel-supporting shank construction in which the shovels may be quickly and easily attached to and detached from their supporting shanks.

The advent of farm tractors having enhanced the utility of cultivators, it has become common to construct cultivators of relatively great width with relatively large numbers of shovel-supporting shanks and to supply for such a cultivator a number of sets of shovels, the shovels of each set being of a particular size and shape to meet a particular condition in a particular soil at a particular stage in the soil-working procedure.

In the use of such cultivators, the task of applying shovels to and removing the same from the numerous shovel-supporting shanks is laborious under any circumstance and frequently is especially laborious and time-consuming, since the shovels are commonly attached to their respective shovel-supporting shanks by means of conventional bolts and nuts, the latter of which frequently "freeze" to the bolts by reason of corrosion or accidental impairment of the threads of the bolts.

An object of the present invention is to provide an improved cultivator shovel and shank construction of simple, durable and inexpensive design, wherein conventional bolts and nuts for attaching the shovels to the shanks are eliminated and, in their stead, simple clamp bolts are employed, the same being readily applied to and removed from shovels and shanks with ordinary tools, quickly and easily to admit of the attachment and the detachment of the shovels to and from the shovel-supporting shanks.

More specifically, it is an object of the invention to provide a cultivator shovel and shank construction, as aforesaid, wherein the shank is formed with a cam thereon and shovel and shank each have an opening therein adapted to register, one with the other, in a seated position of the shovel on the shank, and wherein a clamp bolt, receivable in said registering openings, is formed with a follower lug adapted, upon the turning of the clamp bolt, to coact with said cam and cause the shovel to be clamped or unclamped relative to the shank, the follower lug providing a medium engageable by wrench or pliers to effect the turning of the clamp bolt.

Another object of the invention is to provide a construction, as above, wherein the follower lug assumes a rearwardly extending or trailing position upon the clamping of a shovel to a supporting shank therefor.

A further object of the invention is to provide a construction of the present nature, wherein the seat for the shovel on the shovel-supporting shank is shaped in relation to the shape of the shovel to admit of bowing of the shovel under the clamping action of the clamp bolt, and wherein the cam on the shank is provided at its high portion with a latching groove into which the follower lug in its shovel-clamping position may be latched by the action of the bowed shovel.

Other objects of the invention reside in the novel combination and arrangement of parts and in the details of construction hereinafter illustrated and/or described.

In the drawings:

Fig. 1 is a side elevational view of a cultivator shovel and the lower portion of a cultivator shovel-supporting shank constructed in accordance with my invention, the shovel being shown as clamped to the shank, both shovel and shank being broken away to reveal the anti-skewing dowels for the shovel, the clamp bolt therefor, and the cam on the shank with which said clamp bolt coacts.

Fig. 2 is a view similar to Fig. 1, the clamp bolt being shown as disengaged from the cam on the shank.

Fig. 3 is a bottom plan view of the assembly shown in Fig. 1.

Fig. 4 is a bottom plan view in detail of the shovel shown in Fig. 1.

Fig. 5 is a top plan view in detail of the shovel-supporting shank shown in Fig. 1.

In the drawing, A indicates a cultivator shovel of generally conventional form, the same having a central bearing portion 10 and wings 11 diverging from the point 12 of said shovel. B indicates a shovel-supporting shank, particularly the forwardly and downwardly extending terminal portion thereof, the upper or body portion of such shank (not shown) permissibly being of any conventional form for convenient attachment to the frame of a cultivator. The upper-forward side of the shank B constitutes a seat 13 for the bearing portion 10 of the shovel A, said seat 13 being concave longitudinally of said shank. Intermediately of said seat 13, the shank B is formed with a bore 14 therein extending therethrough from its upper-forward side to its lower-rearward side, and is further formed with a way 15 therein coextensive with said bore 14 and opening laterally thereinto at the leading side thereof.

The bearing portion 10 of the shovel A is similarly formed with a bore 16 and way 17, which respectively match the bore 14 and way 15 in the shank B and register therewith in the seated position of the bearing portion 10 of said shovel on the seat 13 of said shank B, as best seen in Figs. 1 and 2, wherein it will be noted that the bore 16 in the bearing portion 10 of the shovel A is countersunk. Said bearing portion 10 of the shovel A is curved generally to match the concavity in the seat 13 of the shank B, but is actually of slightly less curvature so that a space 18 is provided between the bearing portion 10 of said shovel and the seat 13 on the shank adjacent the localities of the bores 14, 16 in shovel and shank. This spacing of the bearing portion 10 of the shovel A relative to the seat 13 on the shank B admits of the springing or bowing of the former as and for the reason hereinafter explained.

The shovel A is quickly and easily removably clamped to the shank B in its seated position thereon by means of a clamp bolt C which has a cylindrical body 19 with a counter-sink head 20 at one end thereof, and which also has at the tip of the bolt at the other end of said body, a follower lug 21 extending radially outward from said body 19.

In the seated position of the shovel A on the shank B (Fig. 2) the clamp bolt C is inserted, tip foremost, into and through the bore 16 and way 17 in the bearing portion 10 of the shovel, and thence into and through the bore 14 and way 15 in the shank B, said bores 16, 14 and ways 17, 15 respectively receiving the body 19 and follower lug 21 of said bolt C. Thrusting the bolt C home, the head 20 thereof is accommodated in the countersunk bore 16 in the bearing portion 10 of the shovel A and the lug-bearing tip of said bolt extends beneath the lower-rearward side of the shank B at which locality thereon a cam 22 is formed. This cam 22 is of annular formation axially coinciding with the bore 14 in the shank B and has a high portion 22ª at the trailing side of said bore. This high portion 22ª of said cam 22 is formed with a latching recess 23 therein for the reception of the upper edge of the follower lug 21 on the clamp bolt C, said recess 23 extending radially rearward from the bore 14.

The follower lug 21 on the clamp bolt C constitutes a medium which may be readily engaged by a simple tool, such as an ordinary wrench or pliers, to effect the turning of said clamp bolt in the bores 14, 16 of the shovel A and shank B. Thus employing said follower lug 21 in turning the bolt C, said bolt is turned to swing the said follower lug rearwardly and cause it to ride up the cam 22 on one side or the other thereof into a rearwardly extending position. As the follower lug 21 approaches that position, it coacts with the cam 22 flexing and causing the bearing portion 10 of the shovel A to bow into the concavity of the seat 13 on the shank B. Reaching its said rearwardly extending position, the follower lug 21 snaps into the latching recess 23 in the cam 22, entering said recess, under the action of the flexed bearing portion 10 of the shovel A, and remaining in said recess in a trailing position securely lodged therein against any chance of accidental dislodgement therefrom in soil-working usage of the shovel. Thus, after the seating the bearing portion 10 of the shovel A on the shank B, it is firmly secured to said shank merely by introducing the clamp bolt C into the bores 16, 14 and ways 17, 15 of shovel and shank and turning said bolt a one-half turn through the medium of the follower lug 21 thereon. To release the shovel A for its removal from the shank B, it is only necessary to turn the clamp bolt C back to starting position freeing the follower lug 21 from the cam 22 and re-aligning said lug with the registering ways 15, 17 in shank C and shovel A.

The distance across the space 18 between the bearing portion 10 of the shovel A and the seat 13 of the shank B is greater than the depth of the latching recess 23 in the cam 22 to afford sufficient leeway for the bowing of the bearing portion 10 of the shovel A as the follower lug 21 on the clamp bolt C moves into or is moved out of said recess 23. The said distance between the shovel and shank and the depth of said latching recess 23, while actually being relatively little, have been exaggerated in the drawing for the sake of clearness of illustration.

Anti-skewing means are provided to counter any tendency of the shovel A to swivel on the shank B about the axis of the clamp bolt C. The illustrated form of such anti-skewing means consists of a pair of dowels 24 which are secured to and depend from the bearing portion 10 of the shovel A at opposite sides fore and aft of the bore 16 therein. Upwardly opening dowel-bores 25 formed in the shank B removably receive the depending dowels 24 on the shovel A upon its application to the shank B. And said dowels 24 serve to direct the bearing portion 10 of the shovel A properly into its seated position on the shank B, aligning the bore 16 and way 17 in the former with the bore 14 and way 15 in the latter, while serving primarily to prevent any skewing of the shovel A on the shank B about the axis of the clamp bolt C therein. It will be understood, of course, that sufficient tolerance is allowed between the dowels 24 and the walls of the dowel-bores 25 to admit of the ready entry of said dowels into said bores.

Changes in the specific form of the invention, as herein described, may be made within the scope of what is claimed without departing from the spirit of the invention.

Having described the invention, what is claimed as new and desired to be protected by Letters Patent is:

1. In a construction of the character described, a cultivator shovel having a bearing portion, a shovel-supporting shank having a downwardly and forwardly extending terminal portion formed with a seat at the upper-forward side thereof for the body portion of the shovel, a clamp bolt having a body formed with a head and with a follower lug projecting laterally from the body at the tip of the bolt, said bearing portion of the shovel and said terminal portion of the shank each being formed with a bore extending therethrough from its upper-forward side to its lower-rearward side for the reception of the body of the bolt and formed also with a way opening laterally into such bore coextensively therewith for the reception of the follower lug on said body of said bolt, the bore and way in the shovel being adapted to register with the bore and way in the shank in the seated disposition of the shovel on the shank, the registering bores and ways in shovel and shank being adapted to receive the bolt upon its introduction, tip foremost, thereinto, the head of the bolt being adapted to engage the upper-forward side of the bearing portion of the shovel, the tip of said bolt being adapted to extend beneath the lower-rearward side of the shank, said shank having a cam at said lower-rearward side thereof adjacent to the bore therein, said cam having a high portion, the same occupying an angular relation with respect to the bore in the shank differing from that occupied by said way in said shank, the follower lug on the clamp bolt constituting a medium through which said bolt may be turned, said follower lug being adapted upon the turning of said bolt in the shank and its supported shovel to engage and coact with the high portion of said cam and cause said bolt to clamp said bearing portion of said shovel against its said seat on said shank, and anti-skewing means interposed between and coacting with said shovel and shank to prevent the swiveling of the shovel on the shank about the axis of said clamp bolt.

2. A cultivator construction, as defined in claim 1, wherein the way opening into the bore in the shank opens thereinto at the leading side of the bore, and the high portion of the cam on said shank is disposed at the trailing side of said bore, whereby the follower lug on the bolt trails therefrom when the shovel is clamped to the shank by said bolt.

3. A cultivator construction, as defined in claim 1, wherein the high portion of the cam is formed with a latching recess therein for the reception of the follower lug on the clamp bolt, and the bearing portion of the shovel at the locality of the bolt-receiving bore therein is spaced from the shank in the seated position of said shovel on said shank to admit of the bowing of said bearing portion of the shovel at said locality under the clamping action of said bolt, the distance said bearing portion of the shovel is so spaced from said shank being greater than the depth of the latching recess in said cam.

No references cited.